(12) United States Patent
Blevins et al.

(10) Patent No.: US 11,753,137 B2
(45) Date of Patent: Sep. 12, 2023

(54) UTILIZING A CUSTOMIZABLE FUSELAGE ASSEMBLY FOR AN UNMANNED AERIAL VEHICLE

(71) Applicant: Textron Systems Corporation, Hunt Valley, MD (US)

(72) Inventors: Aaron Nathaniel Blevins, Colora, MD (US); Charles David Haskin, II, Taneytown, MD (US); William Gwathmey Bruner, IV, Towson, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 93 days.

(21) Appl. No.: 17/462,395

(22) Filed: Aug. 31, 2021

(65) Prior Publication Data
US 2023/0065140 A1 Mar. 2, 2023

(51) Int. Cl.
*B64C 1/22* (2006.01)
*B64C 1/06* (2006.01)
(Continued)

(52) U.S. Cl.
CPC ............... *B64C 1/064* (2013.01); *B64C 1/14* (2013.01); *B64C 1/22* (2013.01); *B64C 39/024* (2013.01); *B64U 10/25* (2023.01)

(58) Field of Classification Search
CPC .. B64C 1/064; B64C 1/14; B64C 1/22; B64U 10/25
See application file for complete search history.

(56) References Cited

U.S. PATENT DOCUMENTS

| 3,141,819 | A1 | 3/2012 | Brock |
| 9,221,532 | B2 | 12/2015 | Karem |

(Continued)

FOREIGN PATENT DOCUMENTS

| CN | 205952293 U | 2/2017 |
| CN | 212501085 U | 2/2021 |
| WO | 2020107008 | 5/2020 |

OTHER PUBLICATIONS

Anonymous et al.: "Pilot's Handbook of Aeronautical Knowledge", Sep. 17, 2016 (Sep. 17, 2016), pp. 1-524, XP055982347, Retrieved from the Internet: URL:https://web.archive.org/web/20160917044417if_/https://www.faa.gov/regulations_policies/handbooks_manuals/aviation/phak/media/pilot_handbook.pdf[retrieved on Nov. 16, 2022] Chapter 3, 16 pages.

(Continued)

*Primary Examiner* — Tye William Abell
(74) *Attorney, Agent, or Firm* — BainwoodHuang

(57) ABSTRACT

An unmanned aerial vehicle (UAV) includes a fuselage assembly, a further portion that attaches with the fuselage assembly, and a propulsion assembly coupled with the further portion. The propulsion assembly is constructed and arranged to provide propulsion for the UAV. The fuselage assembly includes a fuselage body constructed and arranged to operate as a forward portion of the UAV, lateral stringers coupled with the fuselage body and extending laterally along the fuselage body, and a set of interchangeable covers to cover at least a portion of a payload bay opening defined by the fuselage body. Utilizing such a fuselage assembly offers a highly configurable mounting architecture to accommodate a wide variety of payloads.

17 Claims, 8 Drawing Sheets

(51) Int. Cl.
  *B64C 1/14* (2006.01)
  *B64C 39/02* (2023.01)
  *B64U 10/25* (2023.01)

(56) References Cited

U.S. PATENT DOCUMENTS

| | | | |
|---|---|---|---|
| 9,669,927 | B2 | 6/2017 | Hodge et al. |
| 9,694,909 | B2 | 7/2017 | Uskert et al. |
| 10,093,418 | B2 | 10/2018 | Lim |
| 10,099,784 | B1 | 10/2018 | Nilson et al. |
| 10,377,488 | B1* | 8/2019 | Reusch ............... B64C 3/16 |
| 10,773,785 | B2 | 9/2020 | Sugaki et al. |
| 2009/0218447 | A1 | 9/2009 | Von Flotow et al. |
| 2010/0012769 | A1* | 1/2010 | Alber ............... B64C 39/02 244/17.23 |
| 2010/0258672 | A1* | 10/2010 | Grabmeier ............... B64D 1/04 244/118.2 |
| 2014/0332620 | A1* | 11/2014 | Earon ............... B64C 39/024 244/119 |
| 2015/0210392 | A1* | 7/2015 | Hodge ............... B64D 9/00 244/118.1 |
| 2016/0288906 | A1* | 10/2016 | Christof ............... B64D 7/00 |
| 2018/0086458 | A1 | 3/2018 | Sartorius et al. |
| 2018/0273158 | A1 | 9/2018 | Courtin |
| 2019/0055021 | A1 | 2/2019 | Ivans |
| 2019/0112025 | A1 | 4/2019 | Sugaki et al. |
| 2020/0180760 | A1 | 6/2020 | Richardson et al. |

OTHER PUBLICATIONS

PCT/US2022/041371; Notification of Transmittal of the International Search Report and the Written Opinion of the International Searching Authority, or the Declaration; dated Nov. 28, 2022; 21 pages.

* cited by examiner

UTILIZING A CUSTOMIZABLE FUSELAGE ASSEMBLY FOR AN UNMANNED AERIAL VEHICLE

BACKGROUND

A conventional aerial drone may carry a payload, but fly without passengers.

Along these lines, the conventional aerial drone may fly based on control from an operator on the ground, in accordance with a preprogrammed flight plan, or even a combination of the two.

For example, one conventional aerial drone may carry a camera to remotely capture aerial views while the drone is in flight. Another conventional aerial drone may carry LIDAR (Light Detection and Ranging) to remotely obtain a topological scan of particular terrain, and so on.

SUMMARY

It should be understood that it is common for the above-described conventional aerial drones to have locked geometries. That is, each drone is provisioned with a custom fuselage for a specific use. Along these lines, the above-described conventional aerial drone that carries a camera has a custom fuselage geometry that specifically accommodates the camera (e.g., perhaps a bottom plate with a large aperture that enables a gimbal holding the camera to protrude from the fuselage). In contrast, the above-described conventional aerial drone that carries LIDAR has a different fuselage geometry (e.g., perhaps a bulkier shell with a smaller aperture), and so on. Even different cameras, LIDAR, etc. may require different fuselage geometries depending on apparatus shapes, sizes, configurations, etc.

Unfortunately, since the above-described conventional aerial drones have locked geometries, it may be difficult or even impractical to reconfigure (or re-purpose) such drones for different uses. For example, there may not be enough payload bay space within the above-described conventional aerial drone that carries a camera to later accommodate LIDAR. Similarly, the bulky fuselage shell of the aerial drone that carries LIDAR may require extensive modification (e.g., cutting open a larger aperture to accommodate a camera, a different shape to provide desired flight performance at different altitudes or to remove camera obstructions, etc.), and so on. As a result, a project or team responsible for a particular undertaking (e.g., surveying a particular geolocation) may have to employ multiple drones to complete that undertaking (e.g., one drone to capture visual images of the geolocation, another drone to scan the terrain, and so on).

In contrast to the above-described conventional aerial drones having locked geometries, improved techniques are directed to utilizing a customizable fuselage assembly for an unmanned aerial vehicle (UAV). Such a customizable fuselage assembly offers a highly configurable mounting architecture to accommodate a wide variety of payloads. To this end, the customizable fuselage assembly includes a fuselage body with a large, open floor and a set of interchangeable covers with different openings and/or geometries to accommodate various payloads. Additionally, the customizable fuselage assembly includes stringers that extend laterally along the fuselage body to provide fuselage strength as well as offer flexible mounting choices. Accordingly, the UAV operator is able to maximize the volume available for larger payloads without sacrificing UAV performance when flying with smaller payloads. Moreover, such a technique offers modularity thus enabling future growth of the system with greater flexibility.

One embodiment is directed to a fuselage assembly for a UAV. The fuselage assembly includes a fuselage body constructed and arranged to operate as a forward portion of the UAV, lateral stringers coupled with the fuselage body and extending laterally along the fuselage body, and a set of interchangeable covers to cover at least a portion of a payload bay opening defined by the fuselage body.

Another embodiment is directed to a UAV that includes a fuselage assembly, a further portion that attaches with the fuselage assembly, and a propulsion assembly coupled with the further portion. The propulsion assembly is constructed and arranged to provide propulsion for the UAV. The fuselage assembly includes:
 (A) a fuselage body constructed and arranged to operate as a forward portion of the UAV,
 (B) lateral stringers coupled with the fuselage body and extending laterally along the fuselage body, and
 (C) a set of interchangeable covers to cover at least a portion of a payload bay opening defined by the fuselage body.

Yet another embodiment is directed to a method of operating a UAV. The method includes installing equipment within a payload bay defined by a fuselage assembly of the UAV. The fuselage assembly includes:
 (A) a fuselage body constructed and arranged to operate as a forward portion of the UAV,
 (B) lateral stringers coupled with the fuselage body and extending laterally along the fuselage body, and
 (C) a set of interchangeable covers to cover at least a portion of a payload bay opening defined by the fuselage body, the payload bay opening providing access to the payload bay.

The method further includes, after installing the equipment, using the set of interchangeable covers to cover at least a portion of the payload bay opening. The method further includes, after using the set of interchangeable covers, flying the UAV while the equipment is installed within the payload bay and the set of interchangeable covers is used to cover at least a portion of the payload bay opening.

In some arrangements, the set of interchangeable covers includes a first cover that protects the equipment while flying the UAV and a second cover having a geometry that is different from that of the first cover. Additionally, the method further includes: removing the first cover that protects the equipment,
 (ii) after the first cover is removed, replacing the equipment within the payload bay with other equipment, and
 (iii) after the equipment is replaced with the other equipment, fastening the second cover to the UAV in place of the first cover to protect the other equipment and returning the UAV to flight.

In some arrangements, the fuselage body includes a nose section, a rear section constructed and arranged to attach to a further portion of the UAV, a left side wall, and a right side wall, each of the left and right side walls extending from the nose section to the rear section.

In some arrangements, the fuselage body defines a forward bay adjacent the nose section of the fuselage body and a mid bay adjacent the rear section of the fuselage body.

In some arrangements, the set of interchangeable covers includes a set of forward bay covers to cover a forward portion of the payload bay opening to the forward bay, and a set of mid bay covers to cover a mid portion of the payload bay opening to the mid bay.

In some arrangements, the set of forward bay covers includes a first forward bay cover that defines a first forward equipment opening having a first forward equipment opening geometry, and a second forward bay cover that defines a second forward equipment opening having a second forward equipment opening geometry. The second forward equipment opening geometry is different from the first forward equipment opening geometry.

In some arrangements, the set of mid bay covers includes a first mid bay cover that defines a first mid equipment opening having a first mid equipment opening geometry, and a second mid bay cover that defines a second mid equipment opening having a second mid equipment opening geometry that is different from the first mid equipment opening geometry.

In some arrangements, the fuselage body further includes a top section that defines at least a portion of a top of the UAV. Additionally, each interchangeable cover is constructed and arranged to mount to a bottom side of the fuselage body that is opposite the top section to cover one of the forward bay and the mid bay.

In some arrangements, the forward bay and the mid bay defined by the fuselage body form a contiguous space and are both accessible through the payload bay opening. Such an arrangement enables equipment in one bay to extend into another bay if necessary thus providing additional flexibility to accommodate larger equipment, oddly shaped equipment, other applications, etc.

In some arrangements, the fuselage body defines a payload bay to house equipment. Additionally, the lateral stringers include a left structural member that runs within the payload bay along the left side wall of the fuselage body, and a right structural member that runs within the payload bay along the right side wall of the fuselage body.

In some arrangements, each of the left and right structural members defines mounting holes to enable the equipment to fasten to the structural members of the fuselage assembly within the payload bay.

In some arrangements, the left and right structural members include composite material which defines flat coplanar top faces to support the equipment within the payload bay. Such features may be further augmented with threaded inserts, pin holes, etc. to permit versatility of mission configurations with a wide variety of mounting options.

In some arrangements, each of the left and right structural members defines a linear forward bay mounting hole pattern to flank a forward bay of the payload bay and a linear mid bay mounting hole pattern to flank a mid bay of the payload bay. Additionally, the linear forward bay mounting hole patterns are spaced apart at a first distance. Furthermore, the linear mid bay mounting hole patterns are spaced apart at a second distance which is less than the first distance.

In some arrangements, the left and right structural members further define lower flanges. Additionally, each interchangeable cover is constructed and arranged to bolt through a fuselage skin of the fuselage body and into the lower flanges defined by the left and right structural members.

Other embodiments are directed to apparatus, devices, assemblies, and so on. Some embodiments are directed to various methods, systems, and componentry which are involved in utilizing a customizable fuselage assembly for an unmanned aerial vehicle.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing a customizable fuselage assembly for an unmanned aerial vehicle. Such a customizable fuselage assembly offers a highly configurable mounting architecture to accommodate a wide variety of payloads. To this end, the customizable fuselage assembly includes a fuselage body with a large, open payload bay opening and a set of interchangeable covers with different apertures and/or geometries to accommodate various payloads. Additionally, the customizable fuselage assembly includes stringers (or structural members) that extend laterally along the fuselage body serving not only to provide fuselage strength, but also offer flexible mounting choices. Accordingly, the unmanned aerial vehicle operator is able to maximize the volume available for larger payloads without sacrificing vehicle performance when flying with smaller payloads. Moreover, utilizing such a customizable fuselage assembly offers modularity thus enabling future growth of the system with greater flexibility.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
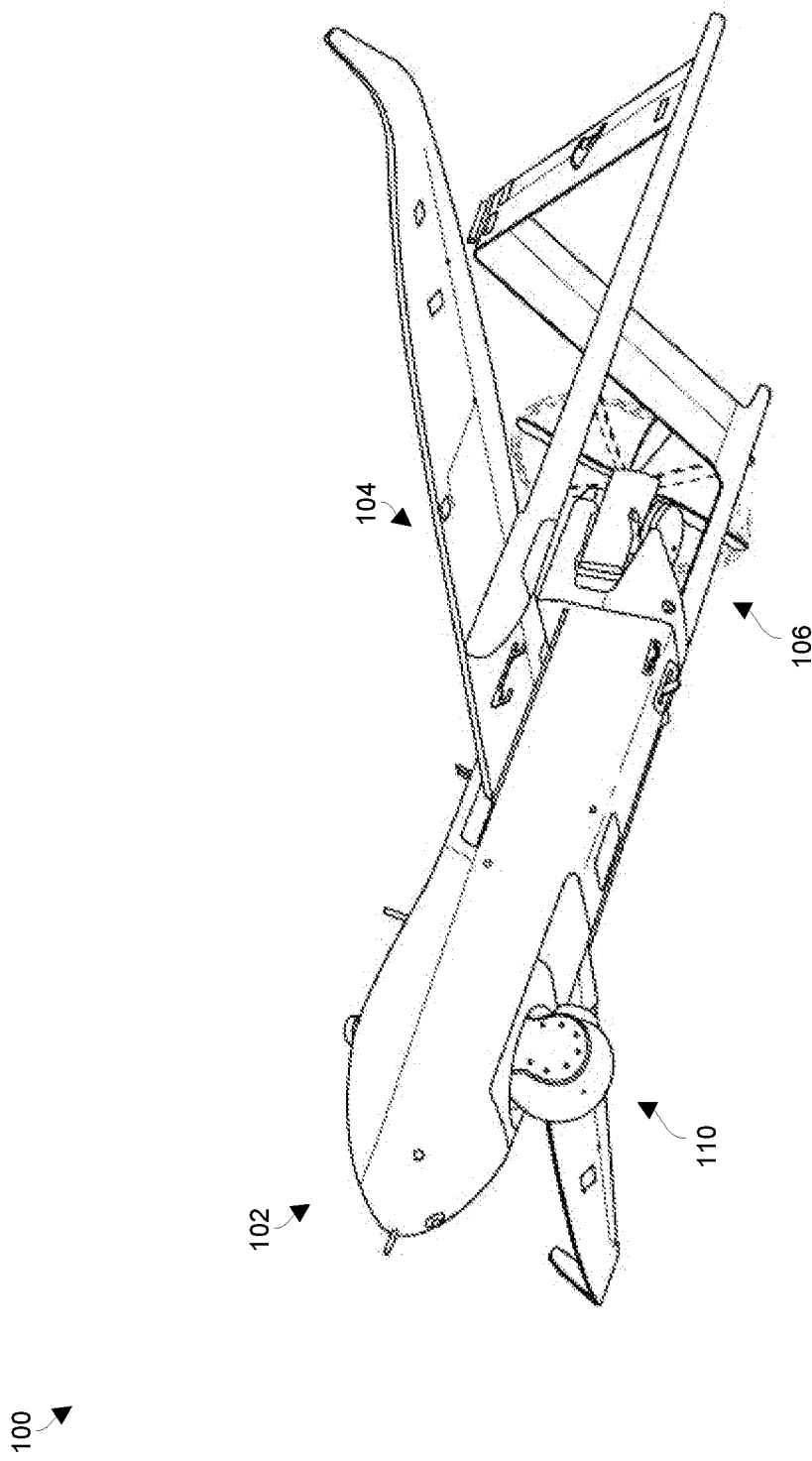
FIG. 1 is a perspective view of an unmanned aerial vehicle (UAV) in accordance with certain embodiments.

FIG. 1 shows an unmanned aerial vehicle (UAV) 100 in accordance with certain embodiments. The UAV 100 includes a customizable fuselage assembly 102, a further portion 104, and a propulsion subsystem 106 (or assembly). As shown in FIG. 1, the further portion 104 may include wings, an empennage, etc.

The customizable fuselage assembly 102 is constructed and arranged to serve as the front section of the UAV 100 and attach to the further portion 104 of the UAV 100. The customizable fuselage assembly 102 is further constructed and arranged to richly and robustly accommodate various types of payload equipment 110. In particular and as will be explained in further detail shortly, the fuselage assembly 102 is customizable by offering a large payload bay opening in a fuselage floor to support installation, housing, and/or operation of an assortment of payload equipment shapes, sizes, mounting constraints, etc. as well as interchangeable covers to properly safeguard at least a portion of the payload equipment 110 while optimizing performance.

The further portion 104 forms a rear section of the UAV 100 and is constructed and arranged to attach to the fuselage assembly 102 and support the propulsion assembly 106 (e.g., to provide lift, control, stability surfaces, etc. for the UAV 100). By way of example, the UAV 100 is illustrated as a fixed wing aircraft capable of horizontal flight. However, it should be understood that the UAV 100 may take a variety of different forms and fly differently, e.g., via vertical flight, vertical takeoff and/or landing (VTOL) and horizontal flight, combinations thereof, etc.

The propulsion assembly 106 is supported by either the fuselage assembly 102, the further portion 104, or both. The propulsion assembly 106 is constructed and arranged to propel the UAV into and/or during flight. The propulsion assembly 106 may further facilitate takeoff and/or landing. The propulsion assembly 106 is rendered as a simple box in FIG. 1 since such propulsion may be provided by one or more liquid fuel engines and/or electric engines to rotate one or more propellers, jet power, combinations thereof, and so on. Further details will now be provided with reference to FIG. 2.

Figure 2:
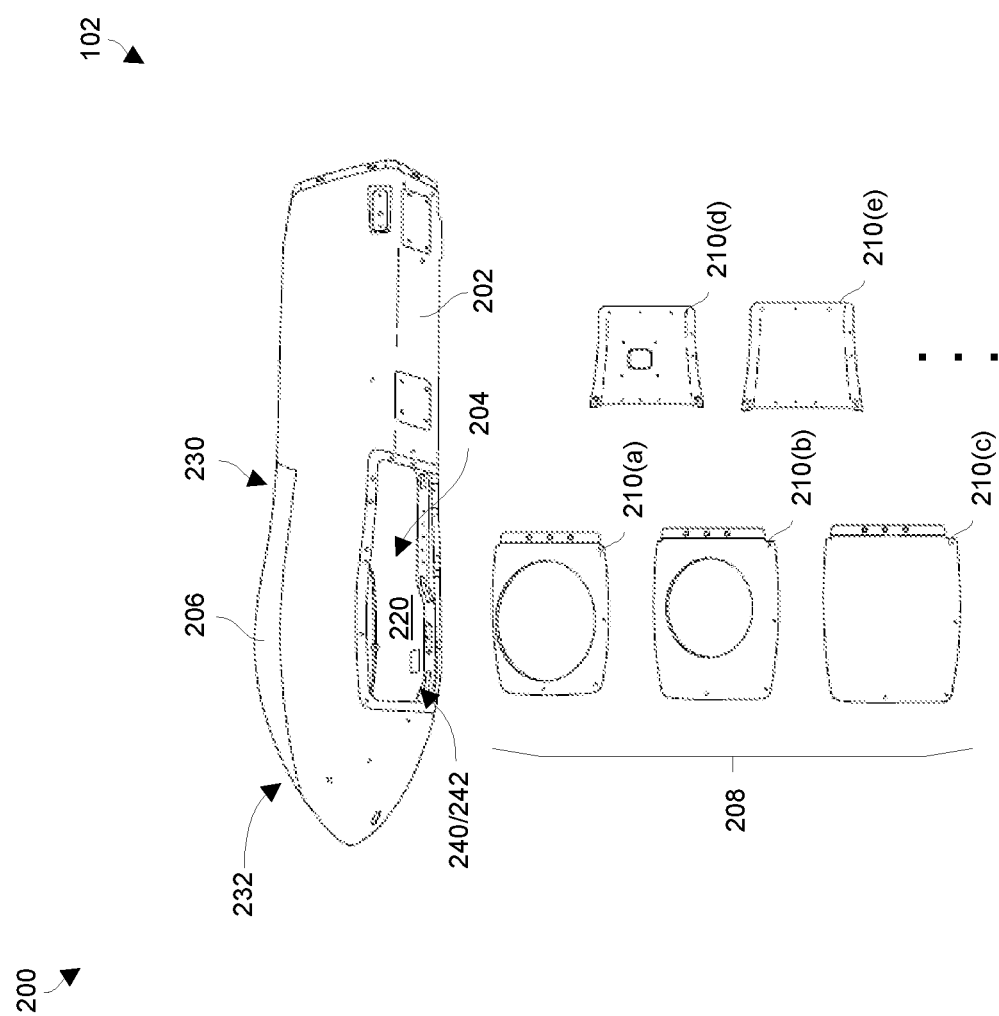
FIG. 2 is a view of a customizable fuselage assembly kit in accordance with certain embodiments.

FIG. 2 shows that the customizable fuselage assembly 102 of the UAV 100 may be provided in the form of a customizable fuselage assembly kit 200. The customizable fuselage assembly kit 200 includes a fuselage body 202, lateral stringers 204, a top cover 206, and a plurality 208 of interchangeable covers 210.

The fuselage body 202 is constructed and arranged to operate as a forward portion of the UAV 100 (also see FIG. 1). Additionally, the fuselage body 202 defines a set of payload bays 220 for carrying the payload equipment 110 during UAV flight.

The lateral stringers 204 couple with the fuselage body 202 and extend laterally along the fuselage body 202 within the set of payload bays 220. Such lateral stringers 204 provide strength to the fuselage body 202 as well as provide a mounting framework for the payload equipment 110.

The top cover 206 is constructed and arranged to attach to a top 230 of the fuselage body 202, and provide a combination of aerodynamic surfaces and protection during UAV flight. When the top cover 206 is removed from the fuselage body 202, access to the set of payload bays 220 is available through a top opening 232 defined by the fuselage body 202.

The plurality 208 of interchangeable covers 210 (e.g., covers 210(a), 210(b), 210(c), 210(d), 210(e), ...) provides a selection of various cover shapes, sizes, and geometries to accommodate the different payload equipment 110 that may be installed on the UAV 100. To this end, the interchangeable covers 210 may be mixed and matched.

When an appropriate combination of covers 210 is attached to a bottom 240 of the fuselage body 202 to cover at least a portion of a payload bay opening 242 opposite the top opening 232, the fuselage assembly 102 provides an appropriate combinations of optimal features. Such features may include shielding surfaces to protect portions of any installed equipment, streamlined airflow for improved flight performance, apertures to accommodate portions of the payload equipment that may extend outwardly from the set of payload bays 220, accessibility, and so on.

By way of example only, forward bay covers 210(a), 210(b), and 210(c) are constructed and arranged to mount over a forward (or front) portion of the payload bay opening 242. By way of example, the forward bay cover 210(a) provides a large aperture, the forward bay cover 210(b) provides a small aperture, and the forward bay cover 210(c) provides no aperture.

Similarly, mid bay covers 210(d) and 210(e) are constructed and arranged to mount over another portion of the payload bay opening 242. By way of example, the mid bay cover 210(d) provides an aperture such as for an antenna, and the mid bay cover 210(e) provides no aperture.

Other cover geometries, combinations, and permutations are suitable for use as well for the interchangeable covers 210. Further details of the interchangeable covers 210 will be provided shortly.

Figure 3:
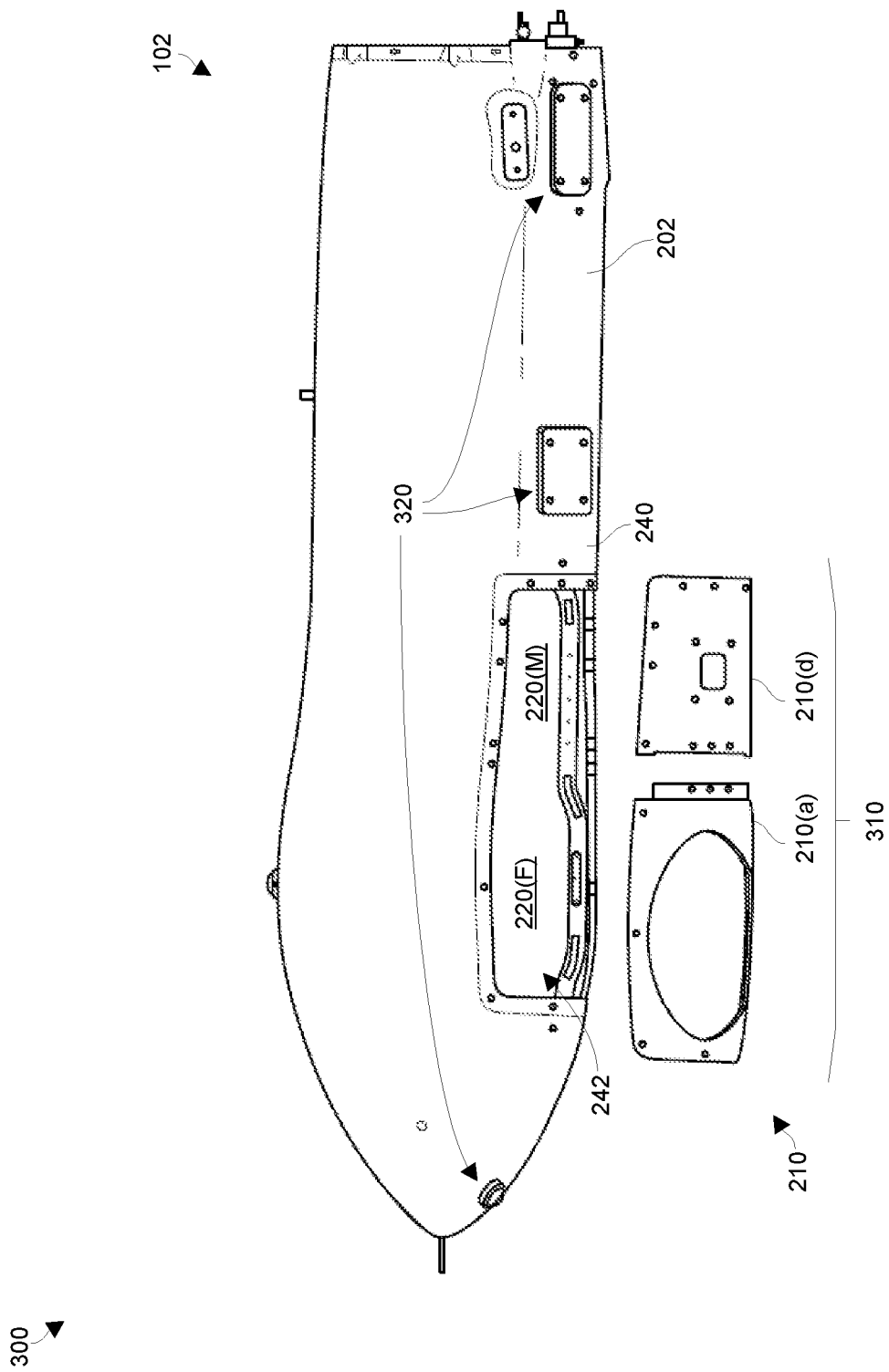
FIG. 3 is a partially exploded view of a customizable fuselage assembly in accordance with certain embodiments.
Figure 4:
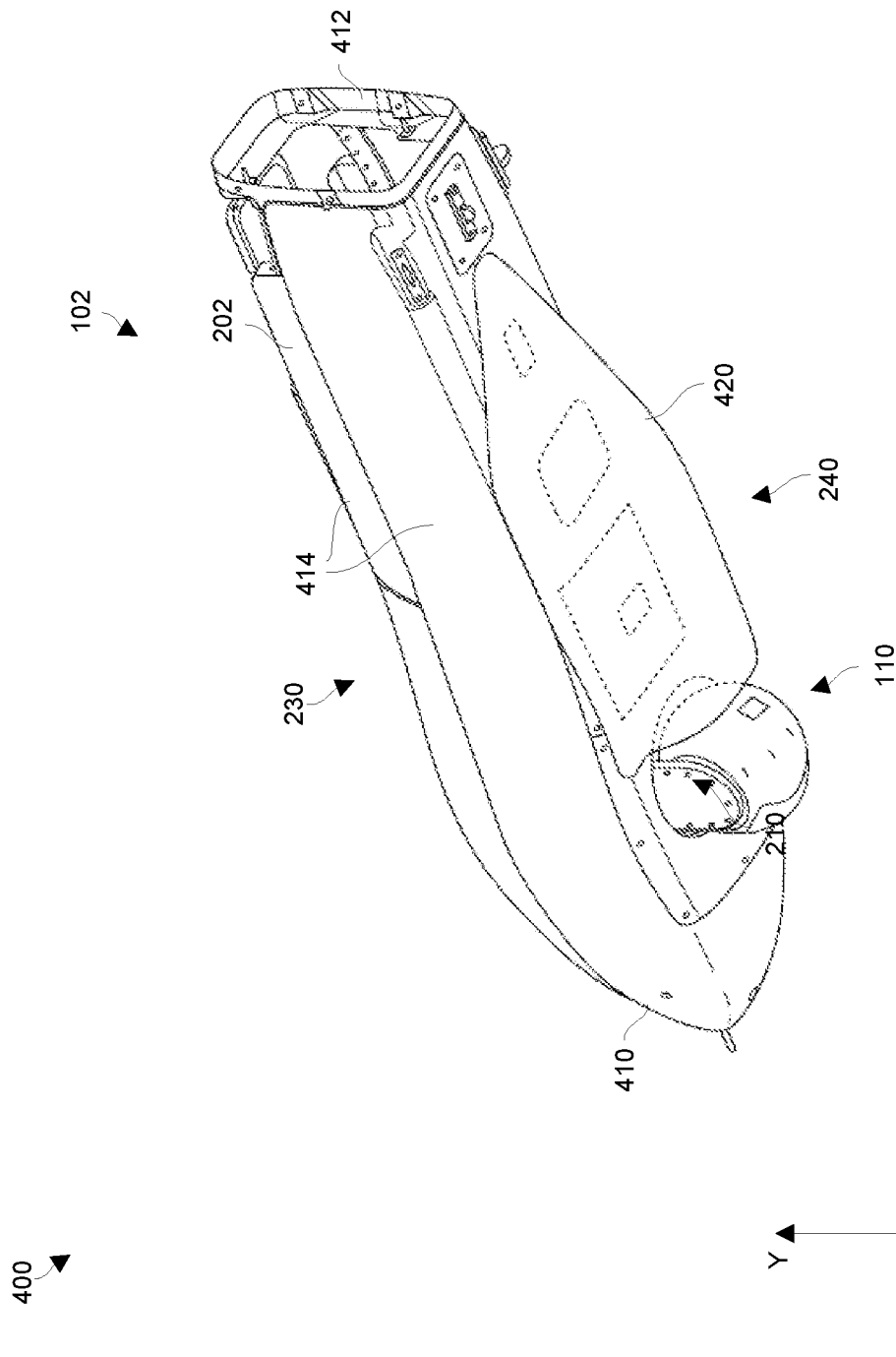
FIG. 4 is an assembled perspective view of the customizable fuselage assembly in accordance with certain embodiments.
Figure 5:
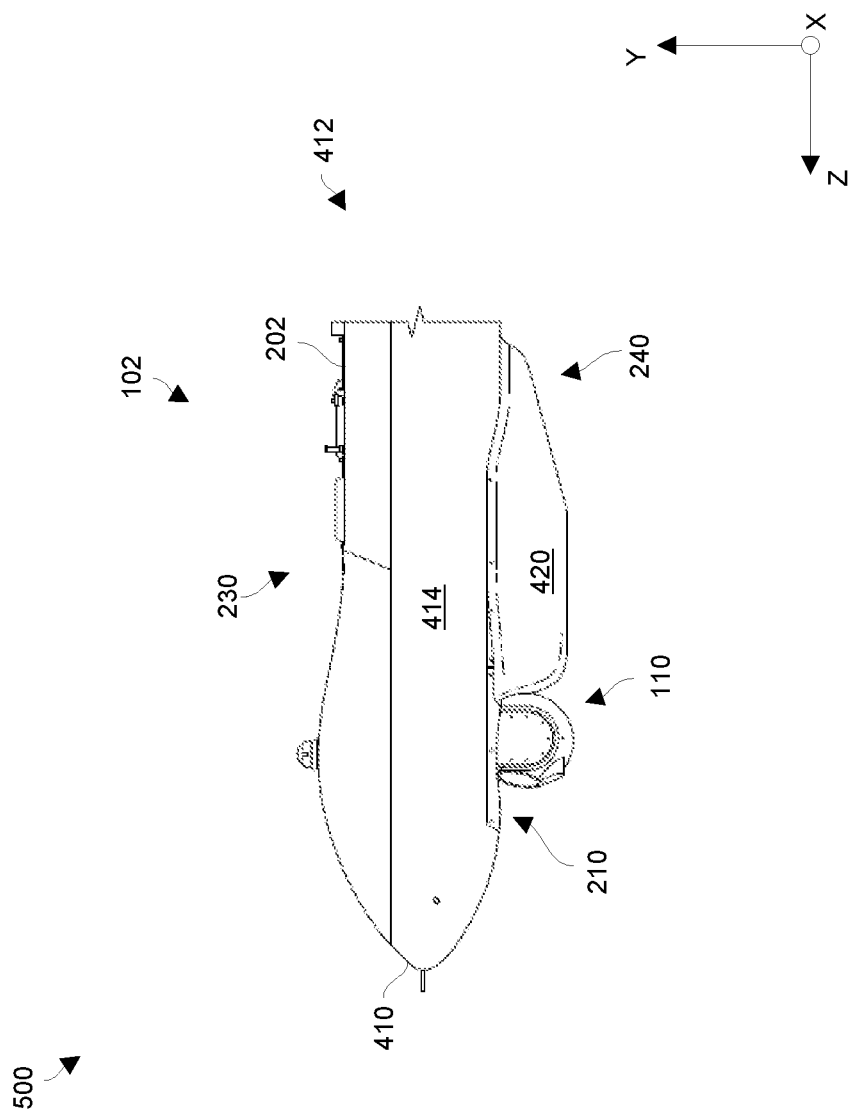
FIG. 5 is an assembled side view of the customizable fuselage assembly in accordance with certain embodiments.
Figure 6:
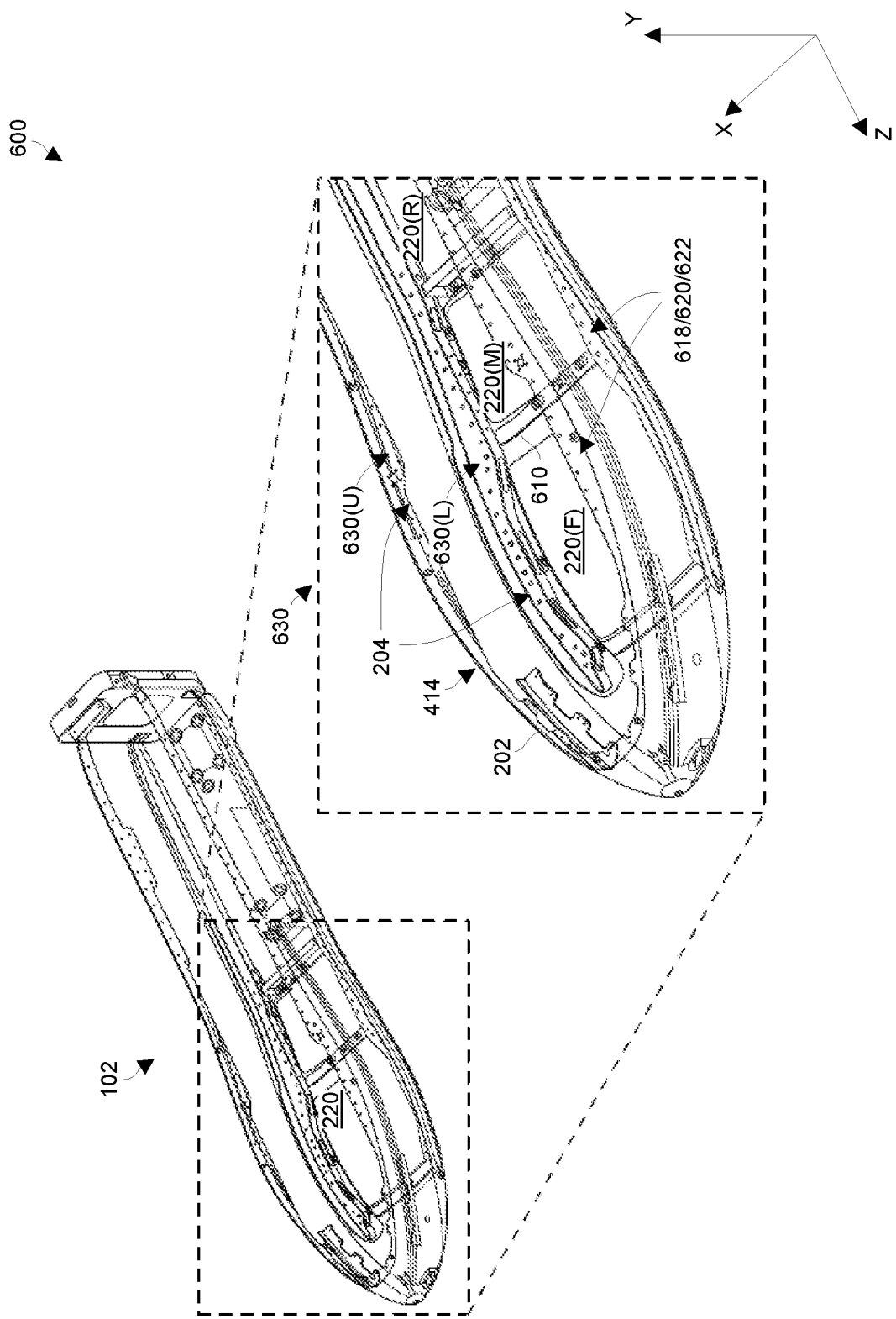
FIG. 6 is a diagrammatic expanded view of a portion of the customizable fuselage assembly in accordance with certain embodiments.
Figure 7:
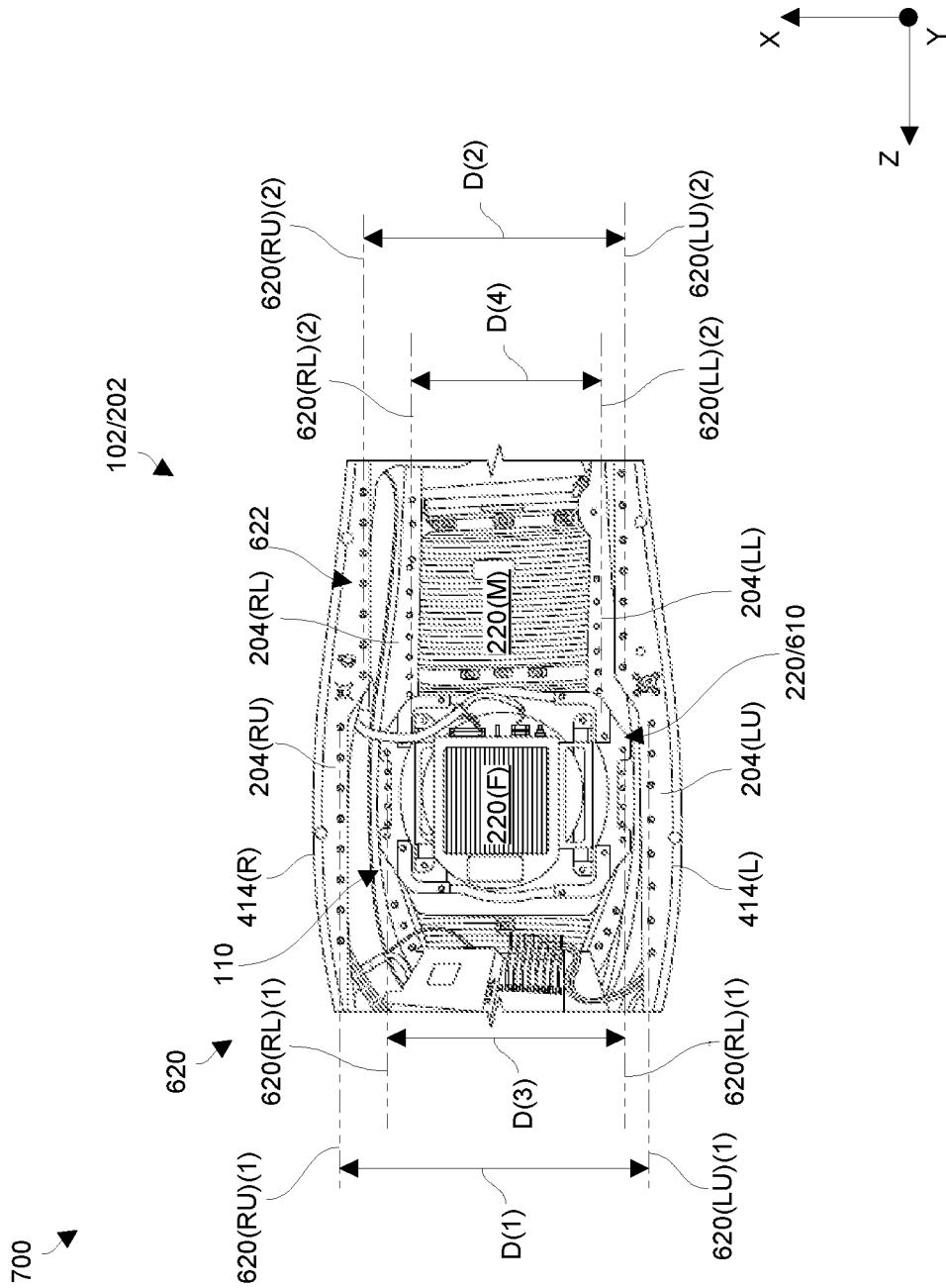
FIG. 7 is a top cutaway view of a portion of the customizable fuselage assembly in accordance with certain embodiments.

FIGS. 3 through 7 show various details of the customizable fuselage assembly 102 of the UAV 100. FIG. 3 is a partially exploded view 300 of the fuselage assembly 102 with a set 310 of interchangeable covers 210 in accordance with certain embodiments. FIG. 4 is an assembled perspective view 400 of the fuselage assembly 102 with the set 310 of interchangeable covers 208 in accordance with certain embodiments. FIG. 5 is an assembled side view 500 of the fuselage assembly 102 with the set 310 of interchangeable covers 208 in accordance with certain embodiments. FIG. 6 is a diagrammatic expanded view 600 of a portion of the fuselage assembly 102 in accordance with certain embodiments. FIG. 7 is a cutaway view 700 of a portion of the fuselage assembly 102 in accordance with certain embodiments.

As shown in the partially exploded view 300 of the customizable fuselage assembly 102 of FIG. 3, a set 310 of the interchangeable covers 210 may be selected from the plurality 208 of interchangeable covers 210 (FIG. 2) for use with the fuselage body 202 at a particular time. It should be understood that various combinations, permutations, etc. of the interchangeable covers 210 may be included within the set 310 based on the particular mission demands, application requirements, equipment involved, etc.

By way of example only, the set 310 includes the forward bay cover 210(a) and the mid bay cover 210(d). The forward bay cover 210(a) is constructed and arranged to cover a front payload bay 220(F) defined by the fuselage body 202. The mid bay cover 210(d) is constructed and arranged to cover a mid payload bay 220(M) defined by the fuselage body 202.

Other combinations of the interchangeable covers 210 are suitable for use as well. Along these lines, cover selection may be based on a variety of factors such as payload shape, payload operation, communication requirements, and so on.

Moreover, it should be understood that other covers (and structures) 320 may be included for use on other portions of the fuselage body 202. Such other covers and structures 320 may provide payload bay access, access to other internal spaces of the fuselage body 202, apertures that enables other componentry to extend from the fuselage body 202, etc.

FIGS. 4 and 5 show assembled views 400, 500 of the fuselage assembly 102 when the set 310 of interchangeable covers 208 is fastened to the fuselage body 202 of the fuselage assembly 102. Once one or more of the set 310 of interchangeable covers 208 is removed, there is access through the payload bay opening 242 into the payload bays 220.

In accordance with certain embodiments, the fuselage body 202 includes a nose section 410, a rear section 412, and wall sections 414 (e.g., side wall sections, a top wall section, a bottom wall section, etc.) extending between the nose section 410 and the rear section 412. Such sections 410, 412, and 414 operate to form the front of the UAV 100 and define a set of payload bays 220 (also see FIG. 2). Along these lines, the nose section 410 is constructed and arranged to serve as the nose of the UAV 100. The rear section 412 is constructed and arranged to attach to the further portion 104 of the UAV 100 (also see FIG. 1).

As best seen in FIGS. 4 and 5, one or more portions of the payload bay equipment 110 may extend through one or more of the interchangeable covers 210 while the interchangeable covers 210 are fastened to the fuselage body 202. Such features enable certain portions of the equipment 110 to reside within the payload bays 220 (e.g., circuitry) while one or more other portions reside outside the payload bays 220 (e.g., a camera, a gimbal, etc.).

For illustration purposes, an external fairing 420 is provided to define a space that is outside the payload bays 220 and outside at least one of the interchangeable covers 210 (e.g., for equipment protection, for aerodynamics, etc.). In some arrangements, the fairing 420 nevertheless enables any equipment outside the payload bays 220 to properly operate (e.g., sense ground and/or air features, communicate with other devices, etc.).

FIG. 6 is an expanded view 600 of a portion of the fuselage assembly 102 in accordance with certain embodiments. FIG. 7 shows a cutaway view 700 of a portion of the fuselage assembly 102. As shown in FIGS. 6 and 7, the fuselage body 202 defines, as the payload bays 220, a forward bay 220(F) and a mid bay 220(M) capable of housing various payload equipment 610. In some arrangements, the payload bays 220 extend further (e.g., in the negative Z-direction) to include one or more other bays 220 such as a rear bay 220(R) (FIG. 6) to accommodate additional payload equipment 110 (FIG. 7). Such equipment 110 may include sensing equipment (e.g., a camera, LIDAR, air sensing equipment, global satellite positioning circuitry, etc.), communications equipment, recording/storage equipment, navigation equipment, power units, control circuitry, and so on.

As best seen in FIG. 6, the forward bay 220(F) and the mid bay 220(M) (and perhaps the rear payload bay 220(R)) defined by the fuselage body 202 form a contiguous space and are both accessible through the payload bay opening 242 (also see FIGS. 2 and 3). Accordingly, the fuselage body 102 provides both modularity as well as flexibility.

In some arrangements, there may be one or more cross members 610 extending across and/or around the payload bay opening 242 (FIG. 2). In other arrangements, there are no cross members 610 extending across and/or around the payload bay opening 242.

Within the payload bays 220, the lateral stringers (i.e., structural members) 204 extend lengthwise to provide strength to the walls 414 of the fuselage body 202 and to support the equipment 110. The lateral stringers 204 may be formed of light weight composite material for minimal flight performance impact on the UAV and to minimize size and interference on the equipment 110.

The stringers 204 include mounting features such as flanges 618 that define rows (or linear arrangements) 620 of mounting holes 622 and flat surfaces for supporting the equipment 110. Such mounting holes 622 enable the equipment to be screwed in, captured via pin, or fastened via other hardware (e.g., clamps, etc.). Additionally, with left and right stringers 204 aligned at the same levels 630, the flanges 618 of the stringers 204 provide sets of flat coplanar top faces to robustly and reliably support equipment 610. Accordingly, the placement of the stringers 204 along the walls 414 and the above-mentioned mounting features provide maximum equipment mounting options to accommodate different equipment configurations. Such flexibility enables the UAV 100 to be easily re-purposed thus alleviating the need for an operator to maintain multiple aircraft for different applications.

In accordance with certain embodiments, there are two levels 630 of stringers 204 along the Y-axis, i.e., an upper level 630(U) of stringers 104 and a lower level 630(L) of stringers 204. Such features enable the fuselage assembly 102 to accommodate different equipment mounting requirements/needs at different mounting heights.

In accordance with certain embodiments and as best seen in FIG. 7, each stringer 204 provides at least one row 620 of mounting holes 622. Along these lines, a right upper stringer 204(RU) provides a first right upper row 620(RU)(1) of mounting holes 622 and a second right upper row 620(RU)(2) of mounting holes 622. Additionally, a left upper stringer 204(LU) provides a first left upper row 620(LU)(1) of mounting holes 622 and a second left upper row 620(LU)(2) of mounting holes 622. Similarly, a right lower stringer 204(RL) provides a first right lower row 620(RL)(1) of mounting holes 622 and a second right lower row 620(RL)(2) of mounting holes 622. Additionally, a left lower stringer 204(LL) provides a first left lower row 620(LL)(1) of mounting holes 622 and a second left lower row 620(LL)(2) of mounting holes 622.

It should be understood that the various rows 620 of mounting holes 622 provided by the stringers 204 allow for different equipment features such as different equipment widths. For example, the distance between the first right upper row 620(RU)(1) of mounting holes 622 and the first left upper row 620(LU)(1) of mounting holes 622 for the forward bay 220(F) is a distance D(1). Additionally, the distance between the second right upper row 620(RU)(2) of mounting holes 622 and the second left upper row 620(LU)(2) of mounting holes 622 for the mid bay 220(M) is a distance D(2) that is narrower than the distance D(1).

Likewise, the distance between the first right lower row 620(RL)(1) of mounting holes 622 and the first left lower row 620(LL)(1) of mounting holes 622 for the forward bay 220(F) is a distance D(3). Furthermore, the distance between the second right lower row 620(RL)(2) of mounting holes 622 and the second left lower row 620(LL)(2) of mounting holes 622 for the mid bay 220(M) is a distance D(4) that is narrower than the distance D(3).

It should be appreciated that the various rows 620 of holes 622 can be mixed and matched in a manner that offers great flexibility for installing payload equipment 110. Due to the flanking arrangement of the rows 620 of mounting holes 622, any combination of equipment widths can be accommodated via proper selection of mounting holes 622.

Moreover such mounting holes 622 enable mounting of the above-mentioned covers. For example, in accordance with certain embodiments, the interchangeable covers 210 bolt through a fuselage skin of the fuselage body 202 and into the lower flanges 618 of the lower left and lower right stringers 204(LL), 204(RL). Further details will now be provided with reference to FIG. 8.

Figure 8:
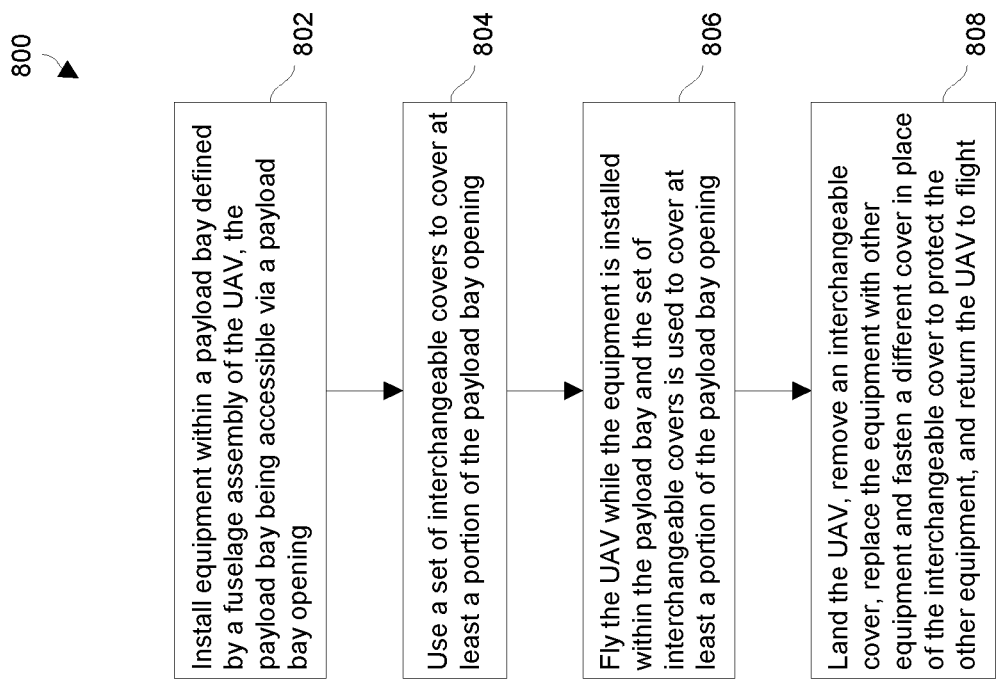
FIG. 8 is a flowchart of a procedure which is performed in accordance with certain embodiments.

FIG. 8 is a flowchart of a procedure 800 which is performed in accordance with certain embodiments. The procedure 800 may be performed by an operator (or user) when operating an unmanned aerial vehicle (UAV).

At 802, the operator installs equipment within a payload bay defined by a fuselage assembly of the UAV. Recall that particular details of a suitable fuselage assembly 102 were described in connection with FIG. 1.

At 804, after installing the equipment, the operator uses a set of interchangeable covers of the fuselage assembly to cover to at least a portion of the payload bay opening. The operator may select certain interchangeable covers based on equipment geometries, flight performance requirements, etc. The operator may also install the external fairing 420 if necessary to cover any equipment secured outside the payload bays 220.

At 806, the operator flies the UAV while the equipment is installed within the payload bay and the set of interchangeable covers is used to cover at least a portion of the payload bay opening. For example, the equipment may include a camera, LIDAR, other sensing equipment, communications circuitry, combinations thereof, etc. and certain portions of the equipment may extend from the payload bay through one or more covers to enable external access.

At 808, the operator lands the UAV, removes the first cover that protects the equipment, replaces the equipment within the payload bay with other equipment, and fastens the second cover to the UAV in place of the first cover to protect the other equipment. At this point, the operator returns the UAV to flight.

Such a procedure 800 enables the operator to utilize the same UAV for multiple applications (or missions) rather than require the operator to use multiple UAVs with locked geometries. Along these lines, one or more activities of the procedure 800 may be repeated to enable the operator to fully exploit the customizability of the fuselage assembly.

As described above, improved techniques are directed to utilizing a customizable fuselage assembly 102 for a UAV 100. Such a customizable fuselage assembly 102 offers a highly configurable mounting architecture to accommodate a wide variety of payload equipment 110. To this end, the customizable fuselage assembly 102 includes a fuselage body 202 with a large, open floor and a set of interchangeable covers 210 with different openings and/or geometries to accommodate various payloads 110.

Additionally, the customizable fuselage assembly 102 includes stringers 204 that extend laterally along walls 414 of a fuselage body 202 to provide fuselage strength as well as offer flexible mounting choices. Accordingly, the UAV operator is able to maximize the volume available for larger or complex-shaped payloads 110 without sacrificing UAV performance when flying with smaller or simpler payloads 110. Moreover, such a technique offers modularity thus enabling future growth of the system with greater flexibility.

While various embodiments of the present disclosure have been particularly shown and described, it will be understood by those skilled in the art that various changes in form and details may be made therein without departing from the spirit and scope of the present disclosure as defined by the appended claims.

For example, in accordance with certain embodiments, the UAV 100 was illustrated as a fixed wing aircraft by way of example only. The UAV 100 may configured differently, e.g., use a set of propellers for vertical flight, use articulating propellers to provide both vertical and horizontal flight, and so on.

It should be appreciated that conventional UAV products have been confined by payload mounting features and openings locked by the geometry of the fuselage structure. Such conventional UAVs use flush-mounted covers and confined payload spaces that typically require customization and tailoring for a specific use.

In contrast, improved techniques involve a modular open-floor payload bay with removable non-structural covers in accordance with certain embodiments. Such techniques are well suited for the field of UAVs, and structural provisions for mounting payloads inside the UAVs.

In accordance with certain embodiments, the payload bay design is a large, open fuselage floor that is reinforced by structural members, referred to as stringers, running down either side of the fuselage. The bottom of the payload bay is closed out using interchangeable covers with openings sized for the equipped camera payload and auxiliary equipment. These features maximize the volume available in the fuselage to enable our air vehicle to carry larger camera payloads without sacrificing the aircraft's performance when flying smaller payloads. Additionally, the interchangeable covers enable custom mounting structures for mission equipment and antennas internal and external to the aircraft.

Accordingly, a highly configurable mounting architecture is established that can accommodate a wide variety of customer payload requirements. This modular payload bay enables future growth of the system by limiting the physical restrictions of mounting provisions and utilizing removable covers instead of a traditional fuselage floor. For example, if a UAV is designed to support an enclosed bay for sensitive electronics and external antenna mount, it cannot be repurposed for a secondary imaging payload into the airflow without a redesign of the base aircraft. However, in accordance with certain embodiments, an open bay design enables customers to dynamically configure the aircraft for the specific mission without being limited by fixed payload openings and a fixed set of mounting provisions.

In accordance with certain embodiments, a vast opening in the fuselage skin underneath section is reserved for mounting payloads. Stringers running along either side of the fuselage, composed of advanced composite materials, provide structural reinforcement while minimizing their obstruction of the available volume. The stringers feature flat, coplanar top faces and vertical surfaces to house convenient attachment locations. Linear mounting hole patterns in the top and side surfaces of the stringers establish a modular mounting architecture so payloads and other equipment can be secured at various fuselage stations to suit the customer's need. An arrangement of threaded inserts and pin holes permits versatility of mission configurations with a wide variety of mounting options available.

Additionally, removable covers close out the bottom of the fuselage by bolting through the fuselage skin and lower flanges of the stringers. Such covers are designed to be interchangeable so different variations of the covers may be attached based on the payloads installed. This feature allows covers to be sized specifically for the camera payloads that need to protrude through an opening in the cover, or for the antennas that need to be secured directly to the bottom of the cover, etc. Cover variants can be equipped that either function as non-structural fairings designed to just close out the fuselage around the payloads, or integral mounting features designed to secure externally mounted antennas to the fuselage. When a new loadout is required, operators can simply swap out the covers with ones intended for that package. The flange of the fuselage skin to which these covers attach is joggled to the thickness of the covers, such that covers remain flush with the outside surface of the fuselage.

It should be further understood that the techniques described herein may be applied in other applications, scenarios, and/or environments. For example, the details described above in connection with the customizable fuselage assembly may be applied to the bodies, hulls, frames, etc. other types of vehicles, craft, and so on. Along these lines, such improvements may be implemented in ground vehicles, watercraft, space craft, etc. Such modifications and enhancements are intended to belong to various embodiments of the disclosure.

What is claimed is:

1. An unmanned aerial vehicle (UAV), comprising:
a fuselage assembly;
a further portion that attaches with the fuselage assembly; and
a propulsion assembly coupled with the further portion, the propulsion assembly being constructed and arranged to provide propulsion for the UAV; the fuselage assembly including:
a fuselage body constructed and arranged to operate as a forward portion of the UAV,
lateral stringers coupled with the fuselage body and extending laterally along the fuselage body, and
a set of interchangeable covers to cover at least a portion of a payload bay opening defined by the fuselage body;
wherein the fuselage body includes a nose section, a rear section constructed and arranged to attach to a further portion of the UAV, a left side wall, and a right side wall, each of the left and right side walls extending from the nose section to the rear section;
wherein the fuselage body defines a payload bay to house equipment;
wherein the lateral stringers include:
a left structural member that runs within the payload bay along the left side wall of the fuselage body, and
a right structural member that runs within the payload bay along the right side wall of the fuselage body;
wherein each of the left and right structural members defines mounting holes to enable the equipment to fasten to the structural members of the fuselage assembly within the payload bay; and
wherein the payload bay is internal to the fuselage body.

2. The UAV as in claim 1 wherein the left and right structural members include composite material which defines flat, coplanar top faces to support the equipment within the payload bay.

3. The UAV as in claim 1 wherein each of the left and right structural members defines a linear forward bay mounting hole pattern to flank a forward bay of the payload bay and a linear mid bay mounting hole pattern to flank a mid bay of the payload bay;
wherein the linear forward bay mounting hole patterns are spaced apart at a first distance; and
wherein the linear mid bay mounting hole patterns are spaced apart at a second distance which is less than the first distance.

4. The UAV as in claim 1 wherein the left and right structural members further include lower flanges; and
wherein each interchangeable cover is constructed and arranged to bolt through a fuselage skin of the fuselage body and into the lower flanges of the left and right structural members.

5. The UAV as in claim 1 wherein the set of interchangeable covers includes a payload bay cover that defines an equipment opening having an equipment opening geometry, the payload bay cover being constructed and arranged to interface with a first portion of the equipment housed inside the payload bay and enable a second portion of the equipment to extend outwardly from the payload bay through the equipment opening.

6. The UAV as in claim 1 wherein the left structural member is coupled to an inner face of the left side wall internal to the fuselage body; and
wherein the right structural member is coupled to an inner face of the right side wall internal to the fuselage body.

7. The UAV as in claim 1 wherein the fuselage body defines a forward bay adjacent the nose section of the fuselage body and a mid bay adjacent the rear section of the fuselage body.

8. The UAV as in claim 7 wherein the fuselage body further includes a top section that defines at least a portion of a top of the UAV; and
wherein each interchangeable cover is constructed and arranged to mount to a bottom side of the fuselage body that is opposite the top section to cover one of the forward bay and the mid bay.

9. The UAV as in claim 7 wherein the forward bay and the mid bay defined by the fuselage body form a contiguous space and are both accessible through the payload bay opening.

10. The UAV as in claim 7 wherein the set of interchangeable covers includes:
a set of forward bay covers to cover a forward portion of the payload bay opening to the forward bay, and
a set of mid bay covers to cover a mid portion of the payload bay opening to the mid bay.

11. The UAV as in claim 10 wherein the set of forward bay covers includes:
a first forward bay cover that defines a first forward equipment opening having a first forward equipment opening geometry, and
a second forward bay cover that defines a second forward equipment opening having a second forward equipment opening geometry that is different from the first forward equipment opening geometry.

12. The UAV as in claim 10 wherein the set of mid bay covers includes:
a first mid bay cover that defines a first mid equipment opening having a first mid equipment opening geometry, and
a second mid bay cover that defines a second mid equipment opening having a second mid equipment opening geometry that is different from the first mid equipment opening geometry.

13. The UAV as in claim 10 wherein the set of forward bay covers includes:
a first forward bay cover that defines a first forward equipment opening having a first forward equipment opening geometry, and
a second forward bay cover that defines a second forward equipment opening having a second forward equipment opening geometry that is different from the first forward equipment opening geometry; and
wherein the set of mid bay covers includes:
a first mid bay cover that defines a first mid equipment opening having a first mid equipment opening geometry, and
a second mid bay cover that defines a second mid equipment opening having a second mid equipment opening geometry that is different from the first mid equipment opening geometry.

14. A fuselage assembly for an unmanned aerial vehicle (UAV), comprising:
a fuselage body constructed and arranged to operate as a forward portion of the UAV;
lateral stringers coupled with the fuselage body and extending laterally along the fuselage body; and
a set of interchangeable covers to cover at least a portion of a payload bay opening defined by the fuselage body;

wherein the fuselage body includes a nose section, a rear section constructed and arranged to attach to a further portion of the UAV, a left side wall, and a right side wall, each of the left and right side walls extending from the nose section to the rear section;

wherein the fuselage body defines a payload bay to house equipment;

wherein the lateral stringers include:
    a left structural member that runs within the payload bay along the left side wall of the fuselage body, and
    a right structural member that runs within the payload bay along the right side wall of the fuselage body;

wherein each of the left and right structural members defines mounting holes to enable the equipment to fasten to the structural members of the fuselage assembly within the payload bay; and wherein the payload bay is internal to the fuselage body.

15. A method of operating an unmanned aerial vehicle (UAV), the method comprising:
    installing equipment within a payload bay defined by a fuselage assembly of the UAV, the fuselage assembly including:
        a fuselage body constructed and arranged to operate as a forward portion of the UAV,
        lateral stringers coupled with the fuselage body and extending laterally along the fuselage body, and
        a set of interchangeable covers to cover at least a portion of a payload bay opening defined by the fuselage body, the payload bay opening providing access to the payload bay;
    after installing the equipment, using the set of interchangeable covers to cover at least a portion of the payload bay opening; and
    after using the set of interchangeable covers, flying the UAV while the equipment is installed within the payload bay and the set of interchangeable covers is used to cover at least a portion of the payload bay opening;

wherein the fuselage body includes a nose section, a rear section constructed and arranged to attach to a further portion of the UAV, a left side wall, and a right side wall, each of the left and right side walls extending from the nose section to the rear section;

wherein the fuselage body defines a payload bay to house equipment;

wherein the lateral stringers include:
    a left structural member that runs within the payload bay along the left side wall of the fuselage body, and
    a right structural member that runs within the payload bay along the right side wall of the fuselage body;

wherein each of the left and right structural members defines mounting holes to enable the equipment to fasten to the structural members of the fuselage assembly within the payload bay; and wherein the payload bay is internal to the fuselage body.

16. The method as in claim 15 wherein the set of interchangeable covers includes a first cover that protects the equipment while flying the UAV and a second cover having a geometry that is different from that of the first cover; and
    wherein the method further comprises:
        removing the first cover that protects the equipment,
        after the first cover is removed, replacing the equipment within the payload bay with other equipment, and
        after the equipment is replaced with the other equipment, fastening the second cover to the UAV in place of the first cover to protect the other equipment and returning the UAV to flight.

17. The method as in claim 15 wherein the fuselage body further defines a top opening that is opposite the payload bay opening;
    wherein the fuselage assembly further includes a top cover to cover at least a portion of the top opening;
    wherein the method further includes:
        removing the top cover from the fuselage body; and
    wherein replacing the equipment within the payload bay with other equipment includes:
        after removing the top cover, removing the equipment within the payload bay through the top opening and inserting the other equipment into the payload bay through the top opening.

* * * * *